United States Patent
Jiang et al.

(10) Patent No.: US 8,116,419 B2
(45) Date of Patent: Feb. 14, 2012

(54) METHODS AND APPARATUSES FOR ESTIMATING TIME DELAY AND FREQUENCY OFFSET IN SINGLE FREQUENCY NETWORKS

(75) Inventors: Hong Jiang, Warren, NJ (US); Vinay Purohit, Branchburg, NJ (US); Paul A. Wilford, Bernardsville, NJ (US)

(73) Assignee: Alcatel Lucent, Paris (FR)

( * ) Notice: Subject to any disclaimer, the term of this patent is extended or adjusted under 35 U.S.C. 154(b) by 729 days.

(21) Appl. No.: 12/216,970

(22) Filed: Jul. 14, 2008

(65) Prior Publication Data

US 2010/0008458 A1 Jan. 14, 2010

(51) Int. Cl.
*H03D 3/24* (2006.01)
(52) U.S. Cl. ........ 375/373; 375/371; 375/372; 375/356; 375/375; 375/376; 455/63.1
(58) Field of Classification Search .................. 375/371, 375/372, 356, 373, 375, 376; 455/63.1
See application file for complete search history.

(56) References Cited

U.S. PATENT DOCUMENTS

| | | | |
|---|---|---|---|
| 6,125,124 A | 9/2000 | Junell et al. | |
| 6,236,695 B1 * | 5/2001 | Taylor | 375/372 |
| 6,459,745 B1 | 10/2002 | Moose et al. | |
| 6,859,641 B2 * | 2/2005 | Collins et al. | 455/63.1 |
| 2002/0181438 A1 | 12/2002 | McGibney | |
| 2002/0197958 A1 | 12/2002 | Collins et al. | |
| 2005/0041639 A1 | 2/2005 | Priotti | |
| 2005/0041693 A1 | 2/2005 | Priotti | |
| 2005/0129149 A1 | 6/2005 | Kuntz | |
| 2006/0088133 A1 | 4/2006 | Chen et al. | |

OTHER PUBLICATIONS

International Preliminary Report on Patentability, dated Jan. 27, 2011, issued in International Application No. PCT/US2009/003881.
Fang Zhi et al.: "A Frequency Offset Estimation Algorithm for OFDM Systems", Journal of Electronics (China), vol. 25, No. 1, Jan. 2008.
"System Specifications for Satellite Services to Handheld Devices (SH) below 3 GHz", Digital Video Broadcasting, DVB Document A110, Mar. 2007.
Stein, S., "Algorithms for Ambiguity Function Processing," IEEE Transactions on Acoustics, Speech, and Signal Processing, Col. ASSP-29, No. 3, Part 2, pp. 588-599, Jun. 1, 1981.
International Search Report dated Nov. 4, 2009.
Written Opinion dated Nov. 4, 2009.

* cited by examiner

*Primary Examiner* — Phuong Phu
(74) *Attorney, Agent, or Firm* — Harness, Dickey & Pierce, P.L.C.

(57) ABSTRACT

In one method, an uplink signal carrying at least one block of transmitted samples is transmitted, and a distorted copy of the uplink signal is received as a downlink signal. A plurality of blocks of received samples are generated based on the received downlink signal, and a time delay and frequency offset between the uplink and downlink signals are determined based on a correlation between the block of transmitted samples and at least one of the plurality of blocks of received samples.

19 Claims, 2 Drawing Sheets

METHODS AND APPARATUSES FOR ESTIMATING TIME DELAY AND FREQUENCY OFFSET IN SINGLE FREQUENCY NETWORKS

BACKGROUND OF THE INVENTION

In a conventional wireless digital transmission system, there is often a need to detect or estimate time and frequency offsets in a received signal relative to a transmitted signal. In a single frequency network (SFN), for example, detected time and frequency offsets are used to synchronize time and frequency of transmitted and received signals. As is well-known, a SFN is a broadcast network in which several transmitters simultaneously transmit the same signal over the same frequency channel. One type of conventional SFN is known as a hybrid satellite and terrestrial SFN. An example hybrid SFN is defined in the Digital Video Broadcasting-Satellite services to Handhelds (DVB-SH) standard "Framing Structure, Channel Coding and Modulation for Satellite Services to Handheld devices (SH) below 3 GHz," *DVB Document A*111 *Rev.* 1, July 2007.

A DVB-SH SFN is a hybrid satellite and terrestrial SFN in which signals are simultaneously transmitted over the same frequency channel via both satellite and terrestrial communications links.

In a conventional DVB-SH SFN, a signal from a satellite has a varying time delay and frequency offset with respect to a terrestrially repeated signal due to the relative motion of the satellite in an inclined orbit. Because of this varying time delay and frequency offset, time and frequency synchronization is necessary to ensure proper reception of signals by receivers in the DVB-SH SFN.

SUMMARY OF INVENTION

Example embodiments provide methods and apparatuses for estimating time delay and frequency offset between transmitted and received signals in a wireless network. The estimated time delay and frequency offset are used to compensate for time delay and frequency offset between signals received concurrently or simultaneously over satellite and terrestrial connections.

In one embodiment, time delay and frequency offset are estimated using a particular correlation algorithm, and the actual time delay and frequency offset are compensated based on the estimated time delay and frequency offset. The same correlation is used to provide estimates for both time delay and frequency offset. The algorithm is independent of waveform and applies to Orthogonal Frequency Division Multiplexed (OFDM), time-division multiplexed (TDM) waveforms, as well as other waveforms.

Furthermore, the correlation contains adjustable parameters that may be used to make trade-off between accuracy and complexity, and improve the reliability of detection according to channel conditions.

In one embodiment of the method, an uplink signal carrying at least one block of transmitted samples is transmitted, and a distorted copy of the uplink signal is received as a downlink signal. A plurality of blocks of received samples are generated based on the received downlink signal, and a time delay and frequency offset between the uplink and downlink signals are estimated based on a correlation between the block of transmitted samples and at least one of the plurality of blocks of received samples. The actual time delay and frequency offset between subsequent transmitted and received signals are compensated based on the estimated time delay and frequency offset.

In one embodiment, the apparatus for time delay and frequency offset compensation in a hybrid single frequency network includes a transmitter, receiver and detector. The transmitter transmits an uplink signal carrying at least one block of transmitted samples. The receiver receives a downlink signal, which is a distorted copy of the transmitted signal and carries a plurality of blocks of received samples. The detector estimates a time delay and frequency offset between the uplink and downlink signals based on a correlation between the at least one block of transmitted samples and at least one of the plurality of blocks of received samples. The plurality of blocks of received samples are generated based on the received downlink signal. The apparatus further includes a modulator for compensating for time delay and frequency offset between subsequent transmitted and received signals based on the estimated time delay and frequency offset.

BRIEF SUMMARY OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Figure 1:
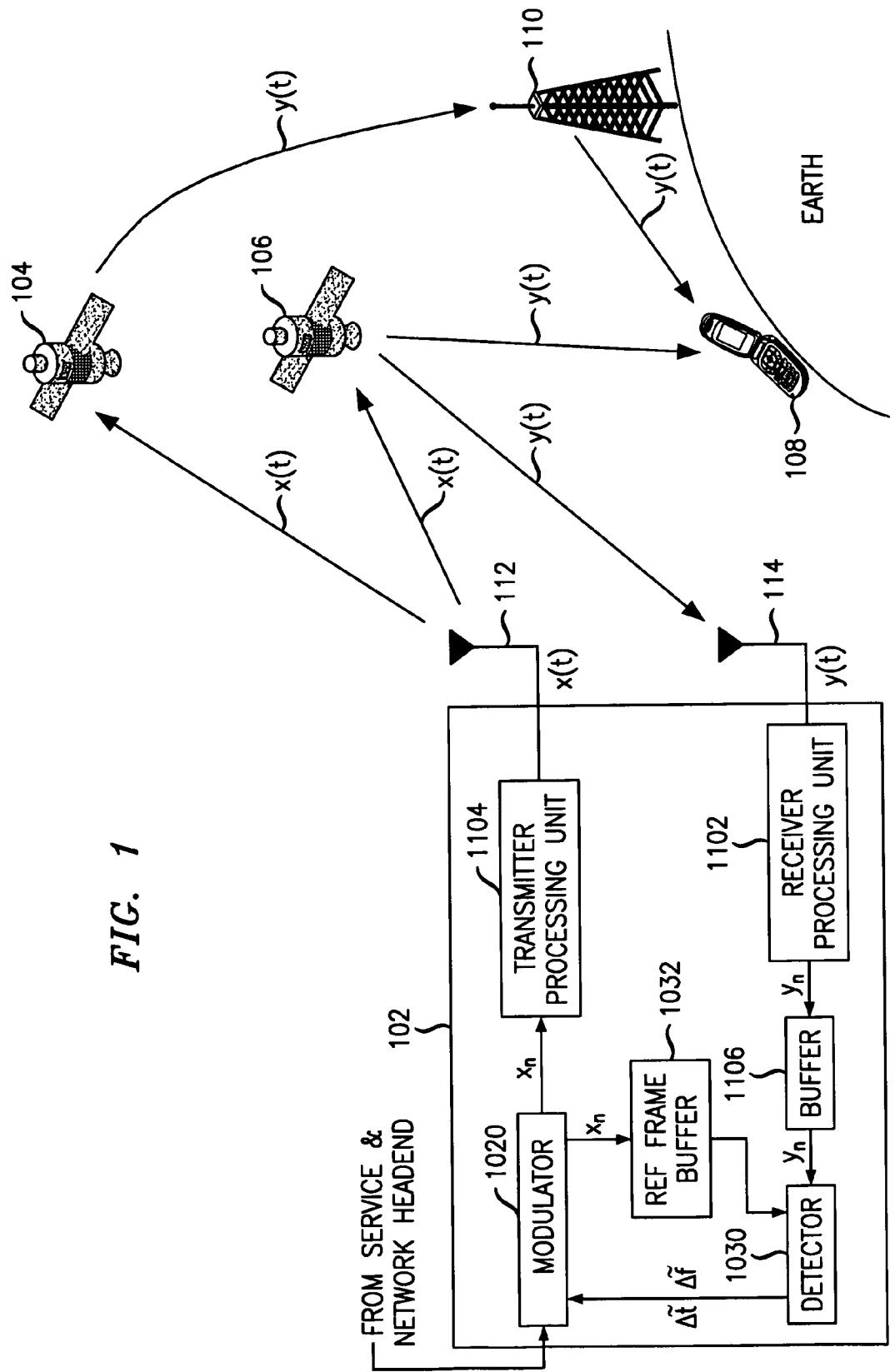
FIG. 1 illustrates an example of a portion of a hybrid single frequency network.

Various example embodiments of the present invention will now be described more fully with reference to the accompanying drawings in which some example embodiments of the invention are shown.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "buffer" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "receiver" may be considered synonymous to, and may hereafter be occasionally referred to, as a client, mobile, mobile unit, mobile station, mobile user, user equipment (UE), subscriber, user, remote station, access terminal, receiver, etc., and may describe a remote user of wireless resources in a wireless communication network.

As described herein, x(t) is referred to as an uplinked or transmitted version of a signal, whereas y(t) is referred to as the downlink or received version of the transmitted signal. The received signal y(t) is a distorted copy of the transmitted signal x(t), but carries the same information. The distortion may be Gaussian noise, frequency offset, time delay, etc.

FIG. 1 illustrates a portion of hybrid satellite and terrestrial single frequency network (hybrid SFN). As shown in FIG. 1, the terrestrial repeated version of the signal travels from the broadcast head end (BHE) to terrestrial repeating antenna 110 via satellite 104, or some other transmission means. The signal then travels from repeating antenna 110 to receiver 108 via a wireless link. The same signal is also received at the receiver 108 via satellite 106, without being repeated by the terrestrial repeating antenna 110.

Due to the relative motion of satellite 106 in an inclined orbit with respect to the receiver 108 on Earth, the signal y(t) received via the satellite 106 has a varying time delay and frequency offset with respect to a terrestrially repeated version of the same signal.

To achieve time and frequency synchronization in such a hybrid SFN, the BHE 102 includes a modulator 1020 for adjusting the time and frequency of subsequent uplink signals so that the downlink satellite signal y(t) arriving at the BHE 102 has a fixed time delay and a fixed center frequency—as if the satellite 106 is stationary with respect to the location of the BHE 102.

Figure 2:
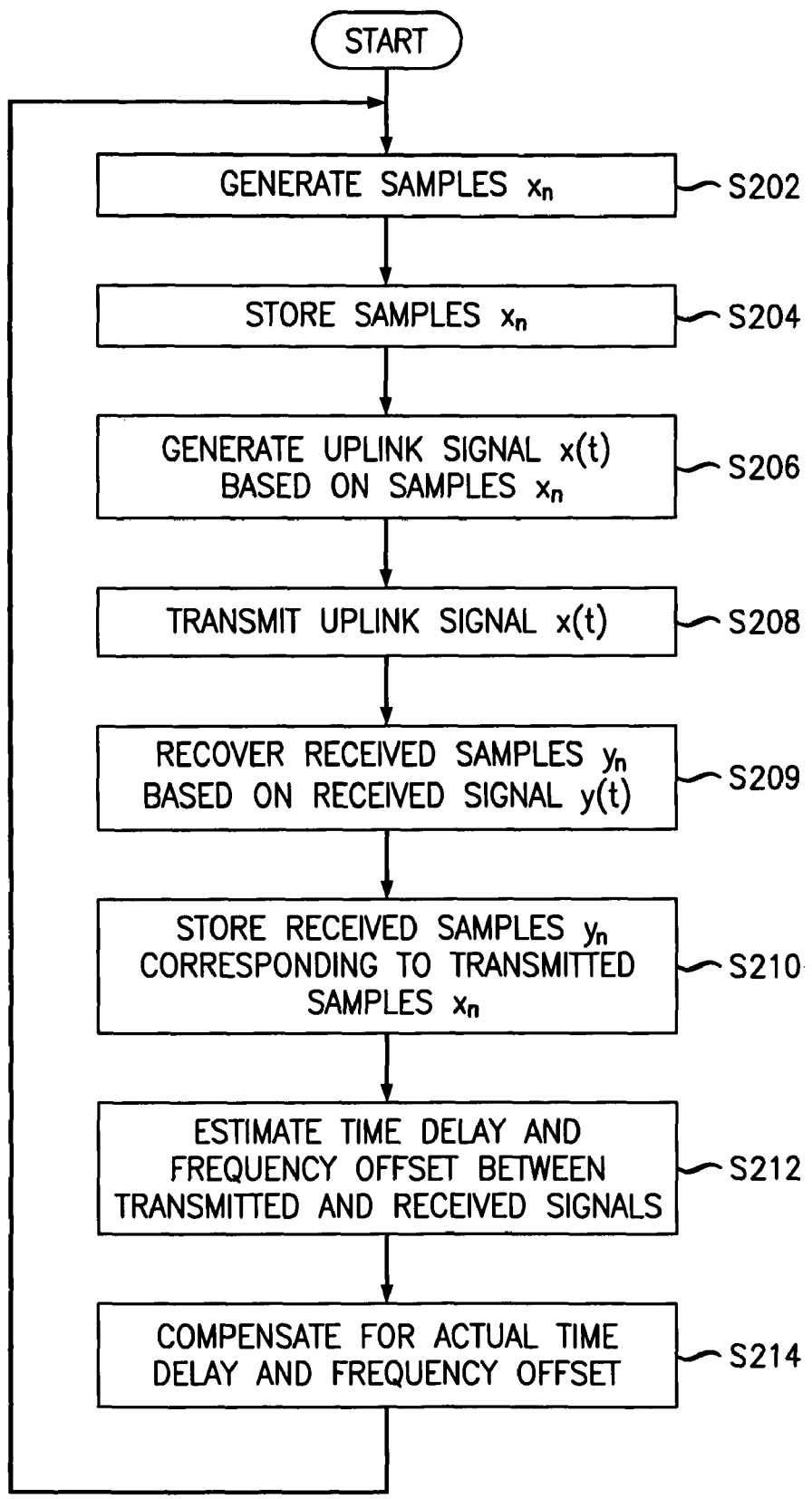
FIG. 2 is a flow chart illustrating a method for time delay and frequency offset compensation according to an example embodiment.

FIG. 2 is a flow chart illustrating a method of compensating for time delay and frequency offset according to an example embodiment. The method shown in FIG. 2 may be performed iteratively at the BHE 102 shown in FIG. 1. For the sake of brevity, only a single iteration will be described in detail.

Referring to FIGS. 1 and 2, at step S202 the modulator 1020 converts multimedia content (e.g., voice, video, pictures, etc.) from a service and network head end (not shown) into digital samples $x_n$ to be transmitted. The manner in which the modulator 1020 generates the samples $x_n$ via sampling is well known in the art, and thus, a detailed discussion will be omitted for the sake of brevity. Consecutive samples $x_n$ are grouped into blocks or frames of samples. Each block or frame of samples includes N samples, where N is an integer (e.g., 1000, 2000, etc.). As discussed herein, the samples $x_n$ may be referred to as "transmitted samples."

The modulator 1020 outputs the generated blocks of samples to a transmitter processing unit 1104 and a reference frame buffer 1032.

At step S204, the consecutive blocks of samples from the modulator 1020 are stored in the reference frame buffer 1032 on a per block basis. For the sake of clarity, example embodiments will be discussed with respect to a single block of samples being stored in the reference frame buffer 1032. However, it will be understood that one or more blocks of samples may be stored at the reference frame buffer 1032. The stored block(s) of samples are indexed by an index b, which is an integer.

At step S206, the transmitter processing unit 1104 sequentially converts each block of samples $x_n$ into an analog uplink signal x(t) suitable for transmission on a wireless uplink channel. Although shown as successive steps, the storing step S204 and the processing step S206 in FIG. 2 may be performed concurrently or simultaneously. In this case, the modulator 1020 outputs the block of samples to the reference frame buffer 1032 and the transmitter processing unit 1104 in parallel.

At step S208, the uplink signal x(t) is broadcast on the uplink channel.

Upon receipt, the satellite 106 broadcasts the signal (now y(t)) on a downlink channel. The broadcast downlink signal is received at the BHE 102 as well as receiver 108. As noted above, the received signal y(t) is a distorted copy of x(t).

Still referring to FIGS. 1 and 2, at step S209 the receiver processing unit 1102 processes the received signal y(t) to recover (or generate) digital samples $y_n$ (referred to as "received samples") carried by the received signal y(t). The sample rate used in generating the transmitted samples $x_n$ and recovering the received samples is assumed to be the same for the sake of clarity. However, the example embodiments may be easily adapted for different sample rates by those skilled in the art.

As is the case with the transmitted samples $x_n$, consecutively received samples $y_n$ are grouped into blocks or frames of samples, each block or frame of samples also including N samples. The consecutive blocks of recovered samples are stored in a feed back capture buffer 1106 on a per block basis. The consecutive blocks of samples are also indexed using index k, where k=0, ±1, ±2, . . . , K. The index k associated with each block of received samples represents a location of a block of received samples within the plurality of blocks of received samples.

To ensure that at least one recovered block of samples $y_n$ stored in the feed back capture buffer 1106 corresponds to the block of transmitted samples stored in the reference frame buffer 1032, the BHE 102 begins storing received samples $y_n$ in the feed back capture buffer 1106 a given period of time after filling the reference frame buffer 1032. That is, after the reference frame buffer 1032 has reached its capacity.

The reference frame buffer 1032 may have the capacity to store 1 or 2 blocks of samples. The size of feed back capture buffer 1106 may vary, but typically is large enough to hold a plurality of blocks of received samples (e.g., about 10 milliseconds of received samples).

The interval of time that the BHE 102 waits before storing received samples may be equal to the round trip delay (RTD) of the signal traveling from the modulator 1020 to the receiver processing unit 1102; namely, between transmission of signal x(t) and reception of signal y(t) carrying corresponding information at the BHE 102.

In one example, if T represents the sample duration, the nominal RTD between transmission and reception of corresponding signals is expressed in terms of the number of samples, and is denoted by D. That is, D·T is the nominal RTD for the transmitted signal to travel from the modulator 1020 to the receiver 1102 via the satellite 106.

After the feed back capture buffer 1106 is full—has reached its capacity—the blocks of received samples $y_n$ are output to the detector 1030 on a per block basis. The reference frame buffer 1032 also outputs the transmitted block of samples $x_n$ to the detector 1030.

At step S212, the detector 1030 estimates a time delay $\tilde{\Delta t}$ and frequency offset $\tilde{\Delta f}$ between the transmission and reception of corresponding signals based on the at least one block of transmitted samples from the reference frame buffer 1032 and at least one of the plurality of blocks of received samples from the feed back capture buffer 1106. An example process for estimating the time delay $\tilde{\Delta t}$ and frequency offset $\tilde{\Delta f}$ will be described in more detail below. The estimated time delay $\tilde{\Delta t}$ and frequency offset $\tilde{\Delta f}$ are output to the modulator 1020.

At step S214, the modulator 1020 compensates for the actual time delay Δt and frequency offset Δf between transmission and reception of corresponding signals based on the estimated time delay $\tilde{\Delta t}$ and frequency offset $\tilde{\Delta f}$. The manner in which the modulator 1020 compensates for the time delay and frequency offset is well-known in the art and thus a detailed discussion will be omitted.

An example method for estimating time delay $\tilde{\Delta t}$ and frequency offset $\tilde{\Delta f}$ will now be described. As noted above, the method may be performed at the detector 1030 in FIG. 1. The method will be described, for the sake of clarity, with regard to an example situation in which the only distortion in the received signal y(t) are actual time delay Δt, frequency offset Δf and Gaussian noise. In this example, the received signal y(t) is represented by Equation (1) shown below.

$$y(t) = \sqrt{P} x(t-\Delta t) \cdot e^{2\pi \Delta f t} + \omega(t) \qquad (1)$$

In Equation (1), P is the power of the received signal y(t) relative to the transmission power of the transmitted signal x(t), and ω(t) is the Gaussian noise. The actual time delay Δt represents the round trip delay (RTD) of the signal traveling from the modulator 1020 to the receiver 1102 via the satellite 106. The actual frequency offset Δf is a result of the Doppler effect due to the motion of the satellite 106.

Assuming that the time delay Δt is an integer multiple of sample duration T, each received sample $y_n$ is given by Equation (2) shown below.

$$y_n = \sqrt{P} x_{n-M} \cdot e^{2\pi \Delta f nT} + \omega_n \qquad (2)$$

In the above equation, M is an additional delay with respect to the nominal delay D, expressed as a number of samples. The additional delay M is related to the time delay Δt and given by Equation (3) shown below.

$$M = \frac{\Delta t}{T} - D \qquad (3)$$

In Equation (3), M represents the instantaneous variation of the time offset with respect to the nominal offset D.

Referring back to FIG. 1, in estimating time delay and frequency offset, the detector 1030 calculates a correlation $C_k$ between the stored block of transmitted samples $x_n$ and each stored block of recovered samples $y_n$. As discussed above, each block of transmitted samples and each block of recovered samples includes the same number of samples—namely N samples. The number N may be determined based on empirical data at a network controller.

The detector 1030 calculates the correlation $C_k$ between the block of transmitted samples and each corresponding block of recovered samples according to Equation (4) shown below.

$$C_k = \sum_{n=0}^{N-1} y_{n+k} \cdot (x_n)^* \cdot (y_{n+k+q} \cdot (x_{n+q})^*)^* \qquad (4)$$

In Equation (4), notation ( )* represents complex conjugate, and q is a parameter that indicates the distance between the samples represented by $y_{n+k}$ and $x_n$ and respective samples $y_{n+k+q}$ and $x_{n+q}$. According to example embodiments, parameter q determines the accuracy of the frequency offset estimate. The larger q becomes, the more accurate the estimate becomes. The value of q may be determined experimentally for a given accuracy requirement. Typically, q may be on the order of between about 10N to about 100N. For a given block of transmitted samples, a correlation is computed for each block of received samples, which are indexed by k=0, ±1, ±2, . . . , K.

According to example embodiments, a single correlation $C_k$ given by Equation (4) is used to estimate both time delay and frequency offset between the transmitted and received signals. The estimate of the time delay $\Delta \tilde{t}$ is obtained by maximizing the amplitude of correlation $C_k$ over index k=0, ±1, ±2, . . . , ±K. That is, the time delay is estimated by identifying the index k associated with the maximum correlation value $C_k$. As discussed herein, the maximum correlation value is referred to as $C_{k_{max}}$ and the index k associated with the maximum correlation $C_{k_{max}}$ is referred to as $k_{max}$. In this example, $k_{max}$ represents a location of the block of received samples associated with the maximum correlation within the plurality of blocks of received samples.

In one example, identification of the maximum correlation $C_{k_{max}}$ may be regarded as searching within a given or desired search window [−K, K], for some K>0 as represented by Equation (5) shown below.

$$|C_{k_{max}}| = \max\{|C_k|, -K \leq k \leq K\} \quad (5)$$

The estimated time delay $\Delta \tilde{t}$ is then calculated based on the index $k_{max}$ associated with the maximum correlation value $C_{k_{max}}$ as shown below in Equation (6).

$$\Delta \tilde{t} = (D + k_{max})T \quad (6)$$

As noted above, D is the nominal delay and T is the sample duration. Stated another way, the estimated time delay $\Delta \tilde{t}$ may be calculated as a function of the index $k_{max}$, the nominal delay D and the sample duration T.

According to example embodiments, the estimated time delay $\Delta \tilde{t}$ given by Equation (6) is valid when the condition given by Equation (7) is met.

$$(D-K)T \leq \Delta t \leq (D+K)T \quad (7)$$

Consequently, in choosing the search window [−K, K], the values of D and K are chosen such that condition (7) is satisfied. The search window [−K, K] may be selected automatically or by a human network operator based on empirical data.

The frequency offset is also estimated based on the maximum correlation value $C_{k_{max}}$. In more detail, the frequency offset is estimated based on the phase of the maximum correlation value $C_{k_{max}}$; that is, the correlation value $C_k$ evaluated at the index $k_{max}$.

The estimated frequency offset $\Delta \tilde{f}$ between the transmitted signal x(t) and the received signal y(t) is given by Equation (8) shown below.

$$\Delta \tilde{f} = \frac{-1}{2\pi qT} \arg(C_{k_{max}}) \quad (8)$$

As noted above, q is a parameter indicating a distance between pairs of samples and T is the sample duration used in generating the samples. The value $\arg(C_{k_{max}})$ is the phase of the correlation $C_k$ evaluated at $k_{max}$. Because computation of the phase of a complex number is well known in the art, only a brief discussion will be provided. In one example, $\arg(C_{k_{max}})$ may be computed according to Equation (9) shown below:

$$\arctan\left(\frac{\operatorname{Im}(C_{k_{max}})}{\operatorname{Re}(C_{k_{max}})}\right) \quad (9)$$

In Equation (9), $\operatorname{Im}(C_{k_{max}})$ is the imaginary part of complex number $C_{k_{max}}$, and $\operatorname{Re}(C_{k_{max}})$ is the real part of the complex number $C_{k_{max}}$.

According to example embodiments, the estimated frequency offset $\Delta \tilde{f}$ is valid for frequency offsets within the range given by the following inequality:

$$\frac{-1}{2qT} < \Delta f < \frac{1}{2qT} \quad (10)$$

The inequality (10) places a condition on the maximum range of the frequency offset for which the algorithm is able to detect/estimate. This range is referred to as the range of frequency detection. As shown in inequality (10), the range of frequency detection is a function of parameter q. There is a trade-off between the size of the range of frequency detection and the accuracy of estimate.

According to example embodiments, the estimated time delay $\Delta \tilde{t}$ and frequency offset $\Delta \tilde{f}$ are used in modulator 1020 to adjust the time and frequency of subsequently transmitted signals. The modulator 1020 is designed to compensate for the time delay and frequency offsets such that $\Delta \tilde{t} = D \cdot T$ and $\Delta \tilde{f} = 0$ in the steady state.

Because the manner in which the estimated time delay and frequency offsets are utilized by the modulator 1020 to compensate for actual time delay and frequency offsets is well-known, a detailed discussion will be omitted for the sake of brevity.

After compensating, a new set of samples is captured in the reference frame buffer 1032 and the feedback capture buffer 1106, and another iteration of processing begins.

The above discussed methods for estimating time delay and frequency offsets and compensating for actual time delay and frequency offsets between transmitted and received signals may be performed iteratively. Iterations between the modulator 1020 and the detector 1030 form a closed loop.

An example application in which the frequency offset for an OFDM waveform is estimated will now be described. However, example embodiments are applicable to other waveforms. In this example, N is defined as the length of a fast Fourier transform (FFT) symbol. If $F_s$ is the frequency spacing between two OFDM sub-carriers, the sub-carrier frequency spacing is given by the following expression:

$$F_s = \frac{1}{NT} \quad (11)$$

In this example, parameter q is normalized with respect to the FFT symbol size N, and the normalized parameter (referred to as Q) is given by Equation (11).

$$Q = \frac{q}{N} \quad (12)$$

In Equation (12), Q represents the number of FFT symbols between a pair of received symbols in the correlation given by Equation (4). As was the case with parameter q, Q in equation (12) is a parameter that determines the accuracy of the frequency offset estimate. The larger Q becomes, the more accurate the estimate becomes. The value of Q may be determined experimentally for a given accuracy requirement. Typically, Q may be on the order of between about 10 to about 100.

Substituting Equation (12) into Equation (8), the estimated frequency offset $\Delta \tilde{f}$ in an OFDM system is given by Equation (13).

$$\Delta \tilde{f} = \frac{-1}{2\pi Q} \arg(C_{k_{max}}) \cdot F_s \quad (13)$$

In terms of the normalized parameters, the range of frequency detection in this example is given by Equation (14).

$$\frac{-1}{2Q} F_s < \Delta f < \frac{1}{2Q} F_s \quad (14)$$

Example embodiments may be implemented in a broadcast head end in a DVB-SH single frequency network. The correlations used for detecting the time and frequency offsets in a single frequency network provide more reliable and accurate estimates of time and frequency offsets.

The invention being thus described, it will be obvious that the same may be varied in many ways. Such variations are not to be regarded as a departure from the invention, and all such modifications are intended to be included within the scope of the invention.

We claim:

1. A method for time delay and frequency offset compensation at a broadcast head end in a hybrid single frequency network, the method comprising:
   transmitting an uplink signal carrying at least one block of transmitted samples;
   receiving a downlink signal, the downlink signal being a distorted copy of the uplink signal;
   generating a plurality of blocks of received samples based on the received downlink signal;
   computing a maximum correlation between the block of transmitted samples and each of the plurality of blocks of received samples;
   estimating a time delay and frequency offset between the uplink and downlink signals based on the maximum correlation, wherein the estimated time delay is based on an index of the block of received samples associated with the maximum correlation; and
   compensating for time delay and frequency offset between subsequent transmitted and received signals based on the estimated time delay and frequency offset.

2. The method of claim 1, further comprising:
   storing, in a first buffer prior to transmission, the block of transmitted samples; and wherein
   the plurality of received samples correspond to the downlink signal received a first time period after the block of transmitted samples is stored in the first buffer.

3. The method of claim 2, further comprising:
   storing, in a second buffer after the first time period, the plurality of blocks of received samples.

4. The method of claim 1, wherein the estimating step further comprises:
   computing a correlation between the block of transmitted samples and each of the plurality of blocks of received samples;
   identifying the maximum correlation among the computed correlations; and
   calculating the estimated time delay based on a location of the block of received samples associated with the maximum correlation within the plurality of blocks of received samples.

5. The method of claim 1, wherein the estimated time delay is calculated as a function of the index, a nominal delay between transmission of the transmitted signal and receipt of the received signal, and a sample duration corresponding to a number of samples in the block of transmitted or received samples.

6. The method of claim 5, wherein the estimated time delay is calculated according to the following equation:

$$\Delta \tilde{t} = (D + k_{max})T; \text{ wherein}$$

$\Delta \tilde{t}$ is the estimated time delay, $k_{max}$ is the index, D is the nominal delay, and T is the sample duration.

7. The method of claim 1, wherein the estimating step further comprises:
   computing a correlation between the block of transmitted samples and each of the plurality of blocks of received samples;
   identifying the maximum correlation among the computed correlations.

8. The method of claim 7, wherein the estimated frequency offset is calculated as a function of the phase of the maximum correlation.

9. The method of claim 8, wherein the estimated frequency offset is calculated according to the following equation:

$$\Delta \tilde{f} = \frac{-1}{2\pi qT} \arg(C_{k_{max}}^b); \text{ wherein}$$

$\Delta \tilde{f}$ is the estimated frequency offset, q is a parameter indicating a distance between corresponding pairs of samples, T is a sample duration corresponding to a number of samples in the block of transmitted or received samples, and $\arg(C_{k_{max}}^b)$ is the phase of the maximum correlation.

10. An apparatus for time delay and frequency offset compensation in a hybrid single frequency network, the apparatus comprising:
   a transmitter for transmitting an uplink signal carrying at least one block of transmitted samples;
   a receiver for receiving a downlink signal, the downlink signal being a distorted copy of the transmitted signal and carrying a plurality of blocks of received samples;
   a detector configured to compute a maximum correlation between the at least one block of transmitted samples and each of the plurality of blocks of received samples, the detector configured to estimate a time delay and frequency offset between the uplink and downlink signals based on the maximum correlation, the plurality of blocks of received samples being generated based on the received downlink signal, wherein the estimated time delay is based on an index of the block of received samples associated with the maximum correlation; and a modulator for compensating for time delay and frequency offset between subsequent transmitted and received signals based on the estimated time delay and frequency offset.

11. The apparatus of claim 10, further comprising:

a first buffer for storing the block of transmitted samples prior to transmission; and wherein
the plurality of received samples correspond to the downlink signal received a first time period after the block of transmitted samples is stored in the first buffer.

12. The apparatus of claim 11, further comprising:

a second buffer for storing the plurality of blocks of received samples after the first time period.

13. The apparatus of claim 10, wherein the detector is further configured to, compute a correlation between the block of transmitted samples and each of the plurality of blocks of received samples;

identify the maximum correlation among the computed correlations; and calculate the estimated time delay based on a location of the block of received samples associated with the maximum correlation within the plurality of blocks of received samples.

14. The apparatus of claim 10, wherein the estimated time delay is calculated as a function of the index, a nominal delay between transmission of the transmitted signal and receipt of the received signal, and a sample duration corresponding to a number of samples in the block of transmitted or received samples.

15. The apparatus of claim 14, wherein the estimated time delay is calculated according to the following equation:

$$\Delta \tilde{t} = (D + k_{max})T; \text{ wherein}$$

$\Delta \tilde{t}$ is the estimated time delay, $k_{max}$ is the index, D is the nominal delay, and T is the sample duration.

16. The apparatus of claim 10, wherein the detector is further configured to, compute a correlation between the block of transmitted samples and each of the plurality of blocks of received samples;

identify the maximum correlation among the computed correlations.

17. The apparatus of claim 16, wherein the estimated frequency offset is calculated as a function of the phase of the maximum correlation.

18. The apparatus of claim 17, wherein the estimated frequency offset is calculated according to the following equation:

$$\Delta \tilde{f} = \frac{-1}{2\pi qT} \arg(C_{k_{max}}^b); \text{ wherein}$$

$\Delta \tilde{f}$ is the estimated frequency offset, q is a parameter indicating a distance between corresponding pairs of samples, T is a sample duration corresponding to a number of samples in the block of transmitted or received samples, and $\arg(C_{k_{max}}^b)$ is the phase of the maximum correlation.

19. A method for time delay and frequency offset compensation at a broadcast head end in a hybrid single frequency network, the method comprising:

transmitting an uplink signal carrying at least one block of transmitted samples;

receiving a downlink signal, the downlink signal being a distorted copy of the uplink signal;

generating a plurality of blocks of received samples based on the received downlink signal; computing a maximum correlation between the block of transmitted samples and each of the plurality of blocks of received samples;

estimating a time delay and frequency offset between the uplink and downlink signals based on the maximum correlation, wherein the estimated frequency offset is calculated as a function of a phase of the maximum correlation; and compensating for time delay and frequency offset between subsequent transmitted and received signals based on the estimated time delay and frequency offset.

* * * * *